United States Patent [19]

Huth et al.

[11] Patent Number: 5,256,731
[45] Date of Patent: Oct. 26, 1993

[54] FLOROURETHANE GROUP-CONTAINING POLYMERS MADE FROM ETHYLENICALLY UNSATURATED MONOMERS, PROCESS FOR THEIR PREPARATION AND THEIR USE

[75] Inventors: Hans-Ullrich Huth, Egelsbach; Karl-Hans Angelmayer, Eltville, both of Fed. Rep. of Germany

[73] Assignee: Hoechst AG, Fed. Rep. of Germany

[21] Appl. No.: 661,053

[22] Filed: Feb. 25, 1991

[30] Foreign Application Priority Data

Feb. 27, 1990 [DE] Fed. Rep. of Germany ....... 4006098

[51] Int. Cl.$^5$ ...................... C08L 35/02; C08F 120/22
[52] U.S. Cl. .................................. 524/805; 524/544; 526/245; 526/248
[58] Field of Search ................ 526/245, 248; 524/805, 524/544

[56] References Cited

U.S. PATENT DOCUMENTS 4,584,143  4/1986  Falk ..................................... 538/240

FOREIGN PATENT DOCUMENTS 625613  6/1963  Belgium .

Primary Examiner—Joseph L. Schofer
Assistant Examiner—Mark Nagumo
Attorney, Agent, or Firm—Bierman and Muserlian

[57] ABSTRACT

Polymers based on ethylenically unsaturated monomers contain at least 0.1% by weight of monomer units comprising specific ethylenically unsaturated, fluorine-containing and polymerization-capable or copolymerization-capable urethane derivatives (see formula I).

The process for the preparation of the polymers or copolymers from the monomers from which they are built up by free-radical initiated polymerization or copolymerization, preferably by a method of emulsion polymerization.

The use of the polymers as a starting material for the production of films, sheets, fibers, adhesives, paints, compression-molding compositions and moldings, as a thickener in aqueous preparations, as an impregnant, binder or coating agent for various industrial or chemotechnological areas of application.

9 Claims, No Drawings

FLOROURETHANE GROUP-CONTAINING POLYMERS MADE FROM ETHYLENICALLY UNSATURATED MONOMERS, PROCESS FOR THEIR PREPARATION AND THEIR USE

DESCRIPTION

The invention relates to polymers based on ethylenically unsaturated monomers which contain units of ethylenically unsaturated, fluorine-containing urethane derivatives, to a process for their preparation by free-radical-initiated polymerization or copolymerization, and their use as coating agents, adhesives, molded plastics and as binders and assistants in chemotechnological preparations.

European Patent 24 908 discloses the preparation of ethylenically unsaturated, fluorine-containing urethanes whose urethane group may have a fluoroalkyl radical on the nitrogen atom. Polymers made from these urethanes are said to be soluble in nontoxic solvents and useful as a dirt-repellent finish having good adhesion to textiles and leathers and a high softening point.

U.S. Pat. No. 4,540,805 discloses the preparation of ethylenically unsaturated, fluorine-containing urethanes whose urethane group is substituted on the carboxyl radical by fluorinated thioether radicals. The compounds can be converted, by bulk, solution or emulsion polymerization, into polymers which are said to be usable, inter alia, for water- and oil-repellent coating of textiles.

European Patent 225 826 discloses the preparation of ethylenically unsaturated, fluorine-containing bisurethanes which can be obtained by stepwise reaction of, firstly, an isocyanate group of tolylene diisocyanate with a fluoroalkanol and then the other isocyanate group with a hydroxyalkyl (meth)acrylate. The process has the disadvantage that, in up to 40% of the tolylene diisocyanate, both the isocyanate groups react with the fluoroalkanol in the first step, which results in considerable losses and makes it necessary to carry out expensive separation operations. Homopolymers and copolymers of the fluorine-containing bisurethanes prepared by solution polymerization are said to be usable for the preparation of water- and oil-repellent coatings on textiles and leather.

As has been shown in practice, the ethylenically unsaturated, fluorine-containing urethanes and their polymers and copolymers which have been disclosed hitherto have a number of disadvantages, such as, for example, starting components which are difficult and expensive to obtain, unsatisfactory yields in the preparation processes, the requirement for complex purification operations in order to eliminate byproducts, unsatisfactory solubility when the monomers are used as comonomers, unsatisfactory homopolymerization and/or copolymerization behavior and an unsatisfactory property spectrum of polymers and/or copolymers.

The invention thus has the object of providing monomeric, ethylenically unsaturated, fluorine-containing urethanes which are simple and economic to prepare, easy to polymerize and copolymerize and where the property spectrum of the polymers makes them easy to use for a broad range of applications, while overcoming the abovementioned difficulties.

Surprisingly, ethylenically unsaturated, fluorine-containing urethane derivatives have now been found whose urethane group is substituted on its carboxyl radical by a fluorinated, organic radical and on its nitrogen atom by an unfluorinated, ethylenically unsaturated organic radical and which are capable of meeting the requirements made of them. The urethane derivatives used according to the invention are liquid or solid under normal conditions, have good solubility in organic solvents and can advantageously be used as a monomer for the preparation of polymers and/or copolymers.

The invention therefore relates to polymers based on ethylenically unsaturated monomers which contain units of ethylenically unsaturated, fluorine-containing urethane derivatives and have been prepared by emulsion, suspension, bead, solution, block or precipitation polymerization or copolymerization, and contain at least 0.1% by weight, based on the polymer or copolymer, of monomer units of ethylenically unsaturated, fluorine-containing urethane derivatives of the formula I

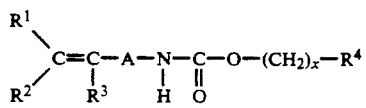

in which $R^1$ to $R^4$, A and the numerical index x have the following meanings:

$R^1$, $R^2$ and $R^3$, which may be identical or different, are H or —$CH_3$, preferably $R^1$ and $R^2$ are H and $R^3$ is —$CH_3$, x is 1 or 2, A is —$(CH_2)_y$— where y is 1 to 6, tert.-butylphenylene —$[C_6H_3—C(CH_3)_3]$— or —$C_6H_4C(CH_3)_2$— or

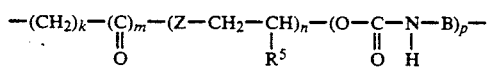

where

Z is oxygen or NH, preferably oxygen, $R^5$ is H, —$CH_3$ or —$C_2H_5$,

B is ($C_6$–$C_{16}$)-arylene which may contain ($C_1$–$C_{10}$)-alkyl radicals, preferably phenylene, tolylene, tert.-butylphenylene, naphthylene, ($C_2$–$C_{12}$)-alkylene or ($C_6$–$C_{10}$)-cycloalkylene, k, m and p are 0 or 1, m is preferably 1, and n is 1 to 5, preferably 1, and $R^4$ is —$(C_2F_4)_qH$, —$(CF_2)_rH$, —$(C_rF_{2r+1})$ or —$C_rF_{2r}$—O—$R^6$, where q is 1 to 6, preferably 1 to 3, r is 1 to 9, preferably 1 to 6, and $R^6$ is ($C_1$–$C_{12}$)-alkyl which may be partially or fully substituted by fluorine atoms, or is ($C_6$–$C_{12}$)-aryl or ($C_7$–$C_{12}$)-alkaryl, each of which may be partially or fully substituted by fluorine atoms, or aqueous dispersions of these polymers or copolymers.

According to the invention, the polymers preferably contain from 0.2 to 100% by weight of monomer units comprising compounds of the formula I and are prepared in particular by bead or emulsion polymerization.

According to the invention, the fluorine content of the polymers and copolymers is preferably at least 0.1% by weight, based on the polymer or copolymer.

In particular, the fluorine content is from 0.1 to 10% by weight, based on the polymer or copolymer.

Polymers according to the invention may, in addition to the monomer units of the formula I, contain up to 99.9% by weight or up to 99.8% by weight, preferably from 1 to 60% by weight, in particular from 4 to 20% by weight, based on the polymer, of comonomer units from the group comprising customary copolymerization-capable vinyl esters, methacrylates, acrylates, vinylaromatic compounds, acrylonitrile, methacrylonitrile, ethylene, vinylidene chloride, vinyl chloride, and monoesters or diesters of crotonic acid, maleic acid, fumaric acid or itaconic acid with ($C_1$-$C_{22}$)-alcohols.

According to the invention, the polymers may furthermore contain from 0 to 99.9% by weight or up to 99.8% by weight, preferably from 0 to 50% by weight, in particular from 1 to 10% by weight, based on the polymer, of comonomer units of copolymerization-capable ethylenically unsaturated monomers containing functional radicals, from the group comprising —OH, —$SO_3H$ or salts thereof, —$N(R^5)_2$, —$N(R^6)_3$, —COOH or salts thereof, —$CON(R^7)_2$, —$N(R^5)$—CO—$NR^5R^6$, —$Si(OR^6)_3$, —PO(OH) or epoxide, where $R^5$ is ($C_1$-$C_6$)-alkyl or H, $R^6$ is ($C_1$-$C_{18}$)-alkyl, ($C_7$-$C_{22}$)-aralkyl, glycidyl, H,-($C_1$-$C_4$)-hydroxyalkyl, or ($C_1$-$C_6$)-carboxyalkyl and $R^7$ is ($C_1$-$C_6$)-alkyl, H, methylol, ($C_1$-$C_4$)-alkoxy or ($C_2$-$C_6$)-alkylsulfonic acid or salts thereof.

In the case of polymers in the form of aqueous dispersions, the minimum film-formation temperature (MFT) of the dispersion is preferably in the range from 0° to 80° C.

Most of the fluorine-containing urethane derivatives of the formula I employed according to the invention as monomers or comonomers and their preparation are subject-matter of the patent application HOE 90/F 061 (file reference P 4006097.7) filed on the same day, to which reference is hereby made.

The fluorine-containing urethane derivatives of the formula I can be homopolymerized or copolymerized according to the invention. Copolymerization is preferred.

The invention therefore furthermore relates to a process for the preparation of homopolymers and copolymers according to the invention by free-radical initiated emulsion, suspension, bead, solution, block or precipitation polymerization or copolymerization of the appropriate starting monomers using conventional polymerization methods.

Particularly preferred monomeric fluorine-containing urethane derivatives of the formula I are those in which, in the formula I, $R^1$ and $R^2$ are H, $R^3$ is —$CH_3$, or $R^1$ and $R^3$ are H, $R^2$ is —$CH_3$, and Z is oxygen.

Suitable comonomeric starting components for the preparation of copolymers according to the invention are preferably, for example, the monomers listed below: ethylenically unsaturated $C_3$-$C_5$-mono- or dicarboxylic acids or monoesters thereof with aliphatic ($C_1$-$C_8$)-alcohols, or mixtures of these monomers, preferably methacrylic acid, acrylic acid, crotonic acid, maleic acid, fumaric acid, itaconic acid, monoalkyl maleates, hydroxylalkyl esters or polyalkylene glycol esters of α,β-ethylenically unsaturated carboxylic acids or monoalkyl ethers thereof, such as, for example, hydroxyethyl acrylate, hydroxyethyl methacrylate, hydroxyethyl crotonate, hydroxypropyl acrylate, hydroxypropyl methacrylate, hydroxypropyl crotonate, hydroxybutyl acrylate, hydroxybutyl methacrylate, hydroxybutyl crotonate, polyethylene glycol acrylate, methacrylate or crotonate, polypropylene glycol acrylate, methacrylate or crotonate, in each case having 2-50 polyalkylene glycol units, in addition the corresponding $C_1$-$C_4$-alkyl ethers or mixtures thereof, and α, β-ethylenically unsaturated amides, such as, for example, acrylamide, methacrylamide, N-methylacrylamide, N-methylmethacrylamide, N,N-dimethylacrylamide, N,N-dimethylmethacrylamide, N-methylolacrylamide, N-methylolmethacrylamide, N-butoxymethylacrylamide, N-butoxymethylmethacrylamide, N-tert.-butylmethacrylamide, N-cyclohexylmethacrylamide, N-benzylmethacrylamide or mixtures thereof, in addition α,β-ethylenically unsaturated sulfonic or phosphonic acids, such as, for example, vinylsulfonic acid, acrylamidomethylpropanesulfonic acid, styrenesulfonic acid, (3-sulfopropyl)methacrylates, vinylphosphonic acid, acrylamidomethylpropanephosphonic acid or the alkali metal and/or ammonium salts thereof, or mixtures thereof, and α,β-ethylenically unsaturated epoxides, such as, for example, glycidyl acrylate, glycidyl methacrylate, furthermore α,β-ethylenically unsaturated silanes, such as, for example, vinyltrimethoxysilane, vinyltriethoxysilane, methacryloxypropyltrimethoxysilane, methacryloxypropyltris(methoxyethoxy)silane, vinyltris(methoxyethoxy)silane, vinyltriacetoxysilane and unsaturated urethanes, such as, for example, N-methylcarbamidoethylmethacrylate,N-butylcarbamidoisopropyl methacrylate, N-octadecylcarbamidoethyl acrylate, N-phenylcarbamidoethylmethacrylate, N-cyclohexylcarbamidoethyl acrylate, furthermore unsaturated ureas, such as, for example, 2-methacryloylethylurea, 2-octylmethacryloylethylurea, 2-phenylmethacryloylethylurea, in addition α,β-ethylenically unsaturated, salt-like, water-soluble monomers containing alkylsulfonium, -phosphonium and preferably -ammonium groups, such as, for example, trimethylammonium ethyl(meth)acrylate chloride, β-acetamidodiethylammonium ethyl(meth)acrylate chloride, (meth)acrylamidopropyltrimethylammoniumchloride,(meth)acrylamidoethyltrimethylammonium bromide, trimethylammonium neopentyl(meth)acrylate chloride, diallyldimethylammonium chloride, diallylbutylmethylammonium bromide or mixtures thereof, and α,β-ethylenically unsaturated primary, secondary or tertiary amines, such as, for example, dimethylaminoethylacrylamide, dimethylaminoneopentyl acrylate, dimethylaminoneopentyl methacrylate, dimethylaminopropyl acrylate, dimethylaminopropyl methacrylate, dimethylaminopropylacrylamide, dimethylaminoprpylmethacrylamide, 2-N-morpholinoethyl acrylate, 2-N-morpholinoethyl methacrylate, tert.-butylaminoethyl acrylate, tert.-butylaminoethyl methacrylate, 4-acrylamido-2,2,6,6-tetramethylpiperidine, 4-methacrylamido-2,2,6,6-tetramethylpiperidine, ethylaminoethyl acrylate, ethylaminoethyl methacrylate, aminoethyl acrylate, aminoethyl methacrylate, furthermore α,β-ethylenically unsaturated monomers which contain fluorine atoms, preferably acrylates or methacrylates with partially or perfluorinated ($C_1$-$C_8$)-alkanols, so long as they do not come under the compounds of the formula I, such as, for example, 2,2,3,4,4,4-hexafluorobutyl methacrylate, 2,2,3,3-tetrafluoropropyl methacrylate, or fluorinated alkylenes, such as, for example, perfluorohexylethylene.

In addition to these monomers, up to 5% by weight, based on the total amount of monomers, of crosslinking-capable, polyunsaturated or polyfunctional compounds, such as, for example, divinylbenzene, diallyl phthalate, butanediol diacrylate, triethylene glycol dimethacrylate, allyl methacrylate, bisphenol A diethylene glycol dimethacrylate, triallyl cyanurate, methylenebismethacrylamide, or up to 5% by weight of molecular weight regulators, such as, for example, dodecyl mercaptan, tetrachloromethane, bromotrichloromethane or tetrakismercaptoacetylpentaerythritol, can be employed in the polymerization.

A copolymer built up from starting components according to the invention can be prepared, for example, by conventional, free-radical initiated solution copolymerization in conventional solvents, or alternatively in the form of an aqueous dispersion by conventional emulsion copolymerization. In the case of preparation by emulsion copolymerization, the solids content of the resultant aqueous dispersion is between 10 and 75% by weight, preferably 30 to 60% by weight. The preferred preparation process is emulsion copolymerization.

In the case of preparation by solution copolymerization, the conventional processes for copolymerization in organic media using free-radical initiators can be used.

In the case of emulsion copolymerization, conventional methods can again be used, i.e. conventional ionogenic and nonionogenic emulsifiers can be employed to emulsify the monomers and to stabilize the latices. Examples of suitable anionic emulsifiers are: alkyl sulfates, alkylaryl sulfates, alkylarylsulfonates, alkali metal and/or ammonium salts of alkyl or alkylaryl glycol ether sulfates; suitable nonionic emulsifiers are: surface-active products of the reaction of aliphatic, cycloaliphatic, araliphatic and aromatic carboxylic acids, alcohols, phenols and amines with epoxides, such as, for example, ethylene oxide, and block copolymers of various epoxides, such as, for example, ethylene oxide and propylene oxide. A further important class of emulsifiers comprises primary, secondary and tertiary fattyamines in combination with organic or inorganic acids and quaternary alkylammonium compounds. It is also possible to employ amphoteric surfactants having a zwitterionic structure, such as, for example, alkylamidopropylbetaines. The abovementioned emulsifiers can be used either individually or in combination with others from the abovementioned groups, but only if they are compatible with one another, which is usually excluded in the case of cationic and anionic compounds.

In the event that the copolymer is predominantly basic or cationic, i.e. the ethylenically unsaturated carboxylic acid(s) has (have) been replaced by monomeric, primary, secondary or tertiary amines or quaternary alkylammonium compounds, the emulsifiers employed are predominantly the abovementioned nonionic compounds and/or cationic surfactants, such as, for example, salts of fatty amines, fatty aminoethoxylates and quaternary alkylammonium compounds.

It is of course also possible to concomitantly use conventional protective colloids in the aqueous dispersions, preferably those based on high-molecular-weight, HO—, $(R)_2N$—, $(R)_3^{(+)}N$—, HOOC— or ROOC— carrying organic compounds, where R may preferably be, for example, an aliphatic radical having 1 to 8 carbon atoms, which are water-soluble or water-dispersible, which have essentially no or no significant surface activity and have a pronounced dispersion capacity. Preferred protective colloids are those having a nonionogenic structure, such as, for example, cellulose ethers, polyvinyl alcohols, polysaccharides, polyvinylpyrrolidones, it being possible for these compounds to be substituted by amino groups, quaternary ammonium groups, carboxyl or carboxylate groups or carboxyalkyl groups (ester groups).

The concentration of such assistants may be from 0 to 20% by weight, in particular from 0.1 to 7% by weight, in the case of emulsifiers and preferably from 0 to 5% by weight, in particular from 0.1 to 2% by weight, in the case of protective colloids, in each case based on the dispersion polymer.

The dispersion polymers according to the invention may preferably be prepared by known processes of free-radical-initiated emulsion polymerization (batch, preemulsion or metering processes), preferably with concomitant use of emulsifiers, protective colloids, dispersants, molecular weight regulators and pH regulators, it being possible to obtain aqueous dispersions having dispersion polymer solids contents of preferably from 10 to 75% by weight, in particular from 30 to 60% by weight, based on the aqueous dispersion. It is possible to produce lower or higher solids contents in the dispersions by conventional methods. The pH of the aqueous dispersions is usually in the range from 3 to 9, preferably from 4 to 8.5. Isolation of the dispersion polymers, for example in powder form, from the dispersions is also possible by conventional methods, preferably, for example, by spray drying or by mixing the dispersion with liquid precipitants by conventional methods.

Examples of suitable solvents for anhydrous dispersion polymers according to the invention are aliphatic and preferably aromatic hydrocarbons, higher alkanols, ethers containing higher alkyl radicals, and cyclic ethers, such as, for example, tetrahydrofuran and dioxane, furthermore ketones and esters.

It is in principle also possible to prepare polymers of the type of the dispersion polymers according to the invention by, for example, free-radical-initiated solution polymerization in organic solvents and to emulsify the resultant organic polymer solutions in water with addition of emulsifier, and subsequently to distil off the organic solvent giving the aqueous polymer dispersions. However, this route is complex and may involve environmental pollution, in contrast to the preferred emulsion, suspension or bead polymerization in an aqueous medium.

In the case of emulsion polymerization for the preparation of dispersion polymers according to the invention, the usual and preferred procedure involves introducing some of the monomer(s) to be used into a conventional polymerization reactor in the aqueous phase, either alone or mixed with other known and copolymerization-capable monomers, initiating the polymerization by free radicals, and metering the remainder of the monomers or monomer mixture into the polymerization reactor, if desired in preemulsified form, over the course of from 1 to 8 hours while stirring and while maintaining the required polymerization temperature in the range of 20° to 100° C., preferably from 40° to 90° C. In some cases it may also be advantageous to introduce all the monomers and the aqueous phase into the polymerization reactor and to carry out the polymerization reaction in the form of a batch process.

The emulsion copolymerization is preferably initiated using conventional water-soluble initiators which initiate free-radical chains, in amounts of from 0.01 to 2% by weight, based on the total amount of monomer. Examples in this respect are, inter alia, alkali metal or ammonium persulfate, but also $H_2O_2$, tert.-butyl hydroperoxide and 4,4'-azobis(4-cyanovaleric acid), 2,2'-azobis-(N,N'-dimethyleneisobutyramidine) dihydrochloride and 2,2'-azobis-2(2-amidinopropane) dihydrochloride. The last two initiators are particularly suitable in the preparation of predominantly cationically charged copolymers. High-energy irradiation and conventional photoinitiators are also possible.

The preferred area of application of the polymers or copolymers according to the invention is their use as coating composition for solid substrates, in particular as anticorrosive coatings on iron and steel, as starting materials for the production of films, sheets, fibers, adhesives, paints, compression-molding compositions and moldings, as thickeners in aqueous preparations, as impregnants for porous substrates, as binders for paints, plasters, ceramic sizes and for the preparation of textile and leather impregnants, for the production of fibrous leather, as binders in papermaking, paper finishing and in the construction industry in the production of concrete and mortar.

The invention is described in greater detail by the examples below, but these do not represent a limitation.

EXAMPLE 1

Preparation of an emulsion copolymer containing a monomeric, fluorine-containing urethane compound of the formula I

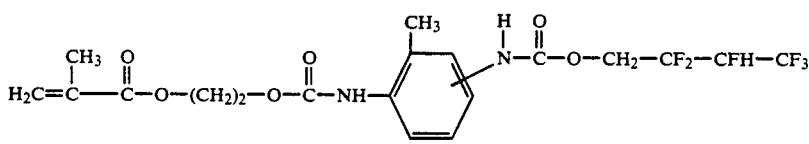

1.88 g of a sodium salt of an alkylpolyglycol ether sulfate (emulsifier) are dissolved in 206.9 g of demineralized water and introduced into a (2 l) three-neck flask equipped with stirrer, reflux condenser and internal thermometer. An emulsion is prepared from 243.7 g of demineralized water, 3.75 g of sodium alkylpolyglycol ether sulfate, 206.5 g of butyl acrylate (BuA) and 168.75 g of methyl methacrylate (MMA), 18.75 g of the abovementioned monomeric fluorine-containing urethane compound of the formula I (=5% by weight, based on the amount of principal monomer comprising BuA and MMA), 7.5 g of methacrylic acid, 3.75 g of acrylic acid and 1.97 g of ammonium persulfate (APS). 15 g of this emulsion are added to the aqueous emulsifier solution, the mixture is warmed to 80° C with stirring. The polymerization is initiated at from 50° to 55° C. by adding 0.175 g of APS, dissolved in 10 g of demineralized water, to the mixture and the remainder of the monomer emulsion is metered in over the course of 3.5 hours at 80° C. with stirring. After a post-reaction phase of 2.5 hours at 80° C., the resultant copolymer dispersion is cooled to room temperature (RT) and adjusted to pH 8.5 by addition of aqueous ammonia. A dispersion is obtained having a solids content of 45% by weight and a minimum film-formation temperature (MFT) of 10° C. The fluorine content of the copolymer is 1.8% by weight, based on the copolymer. The mean particle size of the dispersion is 139 nm (weight average).

EXAMPLE 2

Preparation of an emulsion copolymer containing the comonomeric, fluorine-containing urethane compound of the formula I.

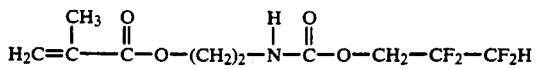

A solution of 1.5 g of a nonylphenol polyglycol ether and 0.75 g of the ammonium salt of a sulfated ethylene oxide/propylene oxide block copolymer in 250 g of demineralized water is introduced into a (2 l) stirred apparatus as described in Example 1. An emulsion is prepared from 129.2 g of demineralized water, 11.7 g of nonylphenol polyglycol ether, 6.8 g of the ammonium salt of a sulfated ethylene oxide/propylene oxide block copolymer, 193.6 g of styrene, 202.4 g of octyl acrylate (OA), 44 g of the abovementioned monomeric fluorine-containing urethane compound of the formula I (=11.1% by weight, based on the amount of principal monomer comprising styrene and OA), 8.8 g of methacrylic acid and 4.4 g of acrylic acid. 12 g of this emulsion are added to the aqueous emulsifier solution, and the mixture is warmed to 82° C. with stirring. The polymerization is initiated at 82° C. by adding 0.31 g of APS, dissolved in 2.6 g of demineralized water, to the mixture, and 15 minutes later, the remainder of the monomer emulsion and, in parallel, 0.57 g of APS, dissolved in 17 g of demineralized water, are metered in over the course of 4 hours at 82° C. with stirring. When the metering is complete, a further 0.13 g of APS, dissolved in 2.6 g of demineralized water, are added, the reaction mixture is allowed to react for a further 3 hours at 82° C.

The resultant copolymer dispersion is cooled to RT and adjusted to pH 8 by addition of aqueous ammonia. A finely divided latex is obtained having a solids content of 49.4% by weight and an MFT of 11° C. The mean particle size is 77 nm (weight average). The fluorine content of the copolymer is 2.65% by weight, based on the copolymer.

EXAMPLE 3

Example 1 is repeated with the difference that the principal monomers MMA and BuA are employed in the weight ratio 40:55, and the comonomeric, fluorine-containing urethane derivative of the formula I used is the compound

in an amount of 10% by weight, based on the amount of principal monomer comprising MMA and BuA. The resultant copolymer dispersion, adjusted to pH 8.5, has a solids content of 46.1% by weight, the MFT is 0° C., the mean particle size is 88 nm and the fluorine content of this copolymer is 3.4% by weight, based on the copolymer.

EXAMPLE 4

Example 1 is repeated with the difference that the principal monomers MMA and BuA are employed in the weight ratio 40:55, and the comonomeric, fluorine-containing urethane derivative of the formula I used is the compound

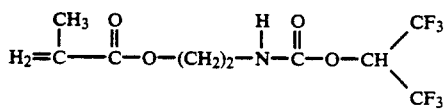

in an amount of 10% by weight, based on the amount of principal monomer comprising MMA and BuA. The resultant copolymer dispersion, adjusted to pH 8.5, has a solids content of 45.7% by weight, the MFT is 4° C., the mean particle size is 92 nm and the fluorine content of the copolymer is 3.5% by weight, based on the copolymer.

EXAMPLE 5

Example 2 is repeated with the difference that the principal monomers styrene and OA are employed in the weight ratio 49:46, and the comonomeric, fluorine-containing urethane derivative of the formula I is used in an amount of 5% by weight, based on the amount of principal monomer comprising styrene and OA. The resultant copolymer dispersion, adjusted to pH 8, has a solids content of 49.2% by weight, the MFT is 11° C., the mean particle size is 143 nm and the fluorine content of the copolymer is 1.3% by weight, based on the copolymer.

EXAMPLE 6

Example 2 is repeated with the difference that the principal monomers styrene and OA are employed in the weight ratio 44:46, and the comonomeric, fluorine-containing urethane derivative of the formula I used is the compound

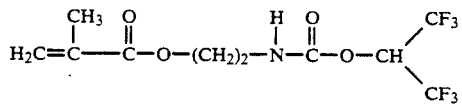

in an amount of 10% by weight, based on the amount of principal monomer comprising styrene and OA. The resultant copolymer dispersion, adjusted to pH 8, has a solids content of 49% by weight, the MFT is 16° C., the mean particle size is 141 nm and the fluorine content of the copolymer is 3.5% by weight, based on the copolymer.

COMPARATIVE EXAMPLE 1

Example 1 is repeated with the difference that no comonomeric, fluorine-containing urethane derivative of the formula I is used, and the principal monomers MMA and BuA are employed in the weight ratio 52:48. The resultant copolymer dispersion, adjusted to pH 8.5, is fluorine free and has a solids content of 46% by weight, the MFT is 18° C. and the mean particle size is 88 nm.

COMPARATIVE EXAMPLE 2

Example 2 is repeated with the difference that no comonomeric, fluorine-containing urethane derivative of the formula I is used, and the principal monomers styrene and OA are employed in the weight ratio 54:46. The resultant copolymer dispersion, adjusted to pH 8, is fluorine free and has a solids content of 50% by weight, the MFT is 15° C. and the mean particle size is 144 nm.

EXAMPLE 7

Applicational tests

The polymers are tested in aqueous dispersion form as a clear varnish. To this end, the dispersions of Examples 1 and 3 and of Comparative Examples 1 and 2, in each case as such, are applied to both sides of degreased, phosphated (=pickled) steel sheets by means of a 75 μm hand coater and, after film formation has taken place, subsequently dried for 14 days in air at room temperature, giving in each case an adherent varnish film about 35 μm thick on the test sheets. The test sheets coated in this manner are subsequently subjected to a salt-spray test in accordance with DIN 53167 in order to test the corrosion protection action of the dispersion polymer films on the steel sheets. The result is shown in summarized form in Table 1 and shows the experimentally determined corrosion behavior of the coated steel test specimens and the surprisingly good corrosion-protecting action of the varnishes comprising the dispersion polymers of Examples 1 and 3 according to the invention, compared with the result using the varnishes comprising conventional dispersion polymers of Comparative Examples 1 and 2. According to the two latter experimental results, the steel test specimens had rusted considerably after exposure to salt spray for 240 hours, while test specimens coated with the varnishes of Examples 1 and 3 according to the invention exhibited greatly reduced corrosion after exposure to salt spray for 240 hours.

TABLE 1

| Salt spray test duration (hours) | Corrosion behavior of steel test sheets coated on both sides with varnish films (about 35 μm thick) in the salt spray test in accordance with DIN 53167. | | | | |
|---|---|---|---|---|---|
| | Corrosion scores from 0 to 5 (0 = no corrosion, 5 = very considerable corrosion) | | | | |
| | NCB = no. of corrosion bubbles SCB = size of corrosion bubbles R = rust | Corrosion scores on steel test sheets with varnish films from: | | | |
| | | Ex. 1 | Ex. 3 | Comp. Ex. 1 | Comp. Ex. 2 |
| 240 | NCB | 2 | 2.5 | 3 | 4 |
| | SCB | 3 | 3 | 5 | 5 |
| | R | 2 | 2 | 4 | 4 |

EXAMPLE 8

Applicational tests

The polymers are tested in aqueous dispersion form as a clear varnish. To this end, the dispersions of Examples 1 and 3 and of Comparative Examples 1 and 2, in each case as such, are applied to both sides of degreased, phosphated (=pickled) steel sheets by means of a 75 μm hand coater and, after film formation has taken place, subsequently dried for 14 days in air at room temperature, giving in each case an adherent varnish film about 35 μm thick on the steel test sheets. The test sheets coated in this manner are subsequently subjected to a water storage test in distilled water at room temperature in order to test the corrosion protection action of the dispersion polymer films on the steel sheets. The result is shown in summarized form in Table 2 and shows the experimentally determined corrosion behavior of the coated steel test specimens and the surprisingly good corrosion-protecting action of the varnish comprising the dispersion polymers of Examples 2 and 3 according to the invention, compared with the result using the varnishes comprising the dispersion polymers of Comparative Examples 1 and 2, whose macromolecules contain no monomer units carrying fluorine-containing urethane groups.

TABLE 2

Corrosion behavior of steel test sheets coated on both sides with varnish films (about 35 μm thick) in distilled water at 20° C.

Corrosion scores from 0 to 5 (0 = no corrosion, 5 = very considerable corrosion)

| Storage duration (hours) in distilled H₂O at 20° C. | NCB = no. of corrosion bubbles SCB = size of corrosion bubbles R = rust | Corrosion scores on steel test sheets with varnish films from: | | | |
|---|---|---|---|---|---|
| | | Ex. 1 | Ex. 3 | Comp. Ex. 1 | Comp. Ex. 2 |
| 120 | NCB | 0.5 | 0.5 | 1 | 2 |
| | SCB | 0.5 | 0.5 | 2 | 1 |
| | R | 0 | 0 | 1 | 2 |

According to the experimental results obtained using the varnish films of Comparative Examples 1 and 2, the surface of the steel test specimens had considerably rusted after exposure to water for 120 hours, while the test specimens coated with the varnishes of Examples 1 and 3 according to the invention exhibited virtually no corrosion on the surface after exposure to water for 120 hours.

EXAMPLE 9

Applicational Tests

The polymers are tested in aqueous dispersion form as leather impregnants for their hydrophobisizing and oleophobisizing action. The test is carried out by the method described in European Patent 225, 826, and the dispersions of Examples 1 to 4 and Comparative Examples 1 and 2 are used. To this end, the dispersions of Examples 1 and 4 are diluted with water until their fluorine content, in each case based on the dilute dispersion, is about 0.08% by weight. The dispersions of Comparative Examples 1 and 2 are diluted analogously with water to comparable solids contents. The tests are carried out as follows:

Pieces of buckskin measuring 8×2 cm are dipped in the above-described aqueous dilutions of the dispersions and subsequently dried for 24 hours at room temperature. As a blank value, a sample is dipped in demineralized water and likewise dried. Individual water drops or individual oil drops are then dropped at room temperature onto the horizontal buckskin samples finished in this way, and the penetration time of the drops into the leather is determined. The results are shown in Table 3, in summarized form.

TABLE 3

Hydrophobisizing or oleophobisizing effect of the polymers on leather

| Polymer from | Penetration time of a water drop | Penetration time of an oil drop |
|---|---|---|
| Example 1 | 6 min. | 1440 min. |

TABLE 3-continued

Hydrophobisizing or oleophobisizing effect of the polymers on leather

| Polymer from | Penetration time of a water drop | Penetration time of an oil drop |
|---|---|---|
| Example 2 | 16 min. | 100 min. |
| Example 3 | 34 min. | 1440 min. |
| Example 4 | 38 min. | 200 min. |
| Comp. Example 1 | 26 sec. | 1 min. |
| Comp. Example 2 | 6 min. | 7 min. |
| Blank | 20 sec. | 1 min. |

As the results in Table 3 show, the polymers according to the invention containing fluorine-containing urethane groups are clearly superior to the comparable fluorine-free polymers from Comparative Examples 1 and 2 and the blank.

We claim:

1. A polymer based on ethylenically unsaturated monomers which contains units of ethylenically unsaturated, fluorine-containing urethane derivatives and has been prepared by emulsion, suspension, bead, solution, block or precipitation polymerization or copolymerization, and contains at least 0.1% by weight, based on the polymer or copolymer, of monomer units of ethylenically unsaturated, fluorine-containing urethane derivatives of the formula I

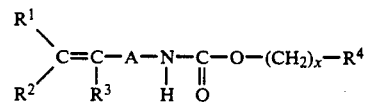

in which $R^1$ to $R^4$, A and the numerical index x have the following meanings:

$R^1$, $R^2$ and $R^3$, which may be identical or different, are H or —CH₃, x is 1 or 2, A is —(CH₂)$_y$— where y is 1 to 6, tert.—butylphenylene —[C₆H₃—C(CH₃)₃]— or —C₆H₄C(CH₃)₂— or

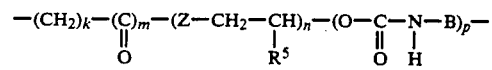

where

Z is oxygen or NH, $R^5$ is H, —CH₃ or —C₂H₅,

B is (C—C₁₆)-arylene which may contain (C₁–C₁₀)-alkyl radicals, (C₂–C₁₂)-alkylene or (C₆–C₁₀)-cycloalkylene, k, m and p are 0 or 1, n is 1 to 5, $R^4$ is —(C₂F₄)$_q$H, —(CF₂)$_r$H, or —C$_r$F$_{2r}$—O—R⁶, where q is 1 to 6, r is 1 to 9, $R^6$ is $(C_1-C_{12})$-alkyl which may be partially or fully substituted by fluorine atoms, or is $(C_6-C_{12})$-aryl or $(C_7-C_{12})$-alkaryl, each of which may be partially or fully substituted by fluorine atoms, or an aqueous dispersion of this polymer or copolymer.

2. A polymer as claimed in claim 1, which contains from 0.2 to 100% by weight of monomer units comprising compounds of the formula I and has been prepared by bead or emulsion polymerization.

3. A polymer as claimed in claim 1, which has a fluorine content of at least 0.1% by weight, based on the polymer or copolymer.

4. A polymer as claimed in claim 1; which has a fluorine content of 0.1 to 10% by weight, based on the polymer or copolymer.

5. A polymer as claimed in claim 1, which contains in addition to the monomer units of the formula I, up to 99.9% by weight of comonomer units selected from the group consisting of customary copolymerization-capable vinyl esters methacrylates, acrylates, vinylaromatic compounds, acrylonitrile, methacrylinitrile, ethylene, vinylidene chloride, vinyl chloride, and monoesters or diesters of crotonic acid, maleic acid, fumaric acid or itaconic acid with $(C_1-C_{22})$-alcohols.

6. A polymer as claimed in claim 1, which contains from 0 to 99.9% by weight of comonomer units of copolymerization-capable ethylenically unsaturated monomers containing functional radicals selected from the group consisting of —OH, —SO$_3$H or salts thereof, —N(R$^8$)$_2$, —N(R$^6$)$_3$, —COOH or salts thereof, —CON(R$^7$)$_2$, —N(R$^8$)—CONR$^8$R$^6$, —Si(OR$^6$)$_3$, —PO(OH) or epoxide, where R$^8$ is $(C_1-C_6)$-alkyl or H, R$^6$ is $(C_1-C_{18})$-alkyl, $(C_7-C_{22})$-aralkyl, glycidyl, H, $(C_1-C_4)$-hydroxyalkyl, or $(C_1-C_8)$-carboxyalkyl and R$^7$ is $(C_1-C_6)$-alkyl, H, methylol, $(C_1-C_4)$-alkoxy or $(C_2-C_6)$-alkylsulfonic acid or salts thereof.

7. A polymer as claimed in claim 1, in the form of an aqueous dispersion whose minimum film-formation temperature (MFT) is in the range from 0° to 80° C.

8. A process for the preparation of a polymer as claimed in claim 1 from the monomeric, ethylenically unsaturated compounds from which it is built up, which comprises subjecting the starting monomers in the necessary amounts to free-radical polymerization or copolymerization by a method of emulsion, suspension, bead, solution, block or precipitation polymerization or copolymerization, and isolating the polymer.

9. The process of claim 8 wherein the polymerization method is emulsion polymerization or copolymerization.

* * * * *